United States Patent [19]

Fishman

[11] Patent Number: 5,192,625
[45] Date of Patent: Mar. 9, 1993

[54] COBALT-BASE WROUGHT ALLOY COMPOSITIONS AND ARTICLES

[75] Inventor: Marvin Fishman, Schenectady, N.Y.

[73] Assignee: General Electric Company, Schenectady, N.Y.

[21] Appl. No.: 486,531

[22] Filed: Feb. 28, 1990

[51] Int. Cl.$^5$ .................. C22C 30/00; B32B 15/00
[52] U.S. Cl. .................... 428/668; 428/678; 420/588; 148/442
[58] Field of Search ............ 420/436, 437, 440, 582, 420/585–588; 148/425, 442; 428/668, 678, 679

[56] References Cited

U.S. PATENT DOCUMENTS

| | | | |
|---|---|---|---|
| 1,449,338 | 3/1923 | McCordy | 420/588 |
| 2,763,547 | 3/1956 | Dyrkacz et al. | 75/171 |
| 3,366,478 | 1/1968 | Wheaton | 75/171 |
| 3,837,838 | 9/1974 | Mohammed | 75/134 |
| 4,124,737 | 11/1978 | Wolfla | 428/640 |

*Primary Examiner*—Deborah Yee
*Attorney, Agent, or Firm*—Schmeiser, Morelle & Watts

[57] ABSTRACT

New cobalt-base wrought alloys containing 24–32% chromium, 14–22% nickel, 2–8% tantalum, 0.02–0.75% cerium and 0.03%–0.10% carbon have an unique combination of high temperature strength, hot corrosion resistance, oxidation-resistance and resistance to thermal fatigue cracking are useful in making weld repairs of cracked nozzles of gas turbine engines, as protective coatings for hot stage components of such engines and other similar purposes.

4 Claims, 4 Drawing Sheets

1000 HOUR RUPTURE STRENGTH

COBALT-BASE WROUGHT ALLOY COMPOSITIONS AND ARTICLES

FIELD OF THE INVENTION

The present invention relates generally to the superalloy branch of the metallurgical art and is more particularly concerned with novel cobalt-base alloys having a unique combination of high temperature strength, oxidation resistance, hot-corrosion resistance and resistance to thermal fatigue cracking, and with new articles thereof.

BACKGROUND

Gas turbine hot section components must be capable of sustained operation under severe conditions of stress and temperature in hostile hot corrosion and erosive environments and thus far only high temperature cobalt-base and nickel-base superalloys have proven to be up to the task. Several cast cobalt alloys are commercially available for turbine applications. Surprisingly, however, the number of commercially available wrought cobalt alloys is quite limited although the need for better ones is of long standing. Thus, wrought alloys used to produce weld wire for fabrication or repair of hot section cobalt alloy structures lack one or another of several desirable properties. At present, two such wrought alloys widely used are incapable of producing component repairs which will withstand thermal cycling for prolonged periods of time. Consequently, the durability of costly hot section repairs continues to be of major concern to the industry.

SUMMARY OF THE INVENTION

By virtue of this invention, based on my new concepts and discoveries detailed below, the shortcomings of the wrought alloys of the prior art are eliminated and new advantages and results of importance are consistently obtained. Moreover, these major benefits are gained without incurring any significant offsetting cost penalty or other detriment.

In making this invention, I discovered that it is possible to meet and satisfy the long-standing demand for a cobalt-base wrought alloy which will withstand gas turbine engine thermal cycling and hot corrosion attack over protracted service periods. Additionally, I have found that this new property can be gained along with such outstanding welding characteristics, in wire form, as flow, wetting, and good machinability.

Another discovery of mine is that weld wire made in accordance with this invention has special utility in repairing cast cobalt-base alloy gas turbine parts. In fact, such parts so repaired have demonstrated nearly ten-fold improvement over corresponding parts repaired with prior art alloys, specifically in respect to resistance to crack initiation in thermal fatigue fluid bed tests.

Surprisingly, the foregoing new results and advantages have been obtained by making relatively small, but critical, changes in the composition of cobalt-base wrought alloys known heretofore. Thus the alloys of this invention contain similar proportions of carbon, nickel and tantalum, somewhat more chromium and correspondingly less cobalt than alloys disclosed in U.S. Pat. No. 3,366,478. The alloys of this invention, however, contain cerium in a small, but effective, proportion as an additional important constituent.

Described generally, the novel alloys of this invention contain, in addition to cobalt, about 0.03 to 0.10 weight percent carbon, about 24 to 32 weight per cent chromium, about 14 to 22 weight percent nickel, about 2 to 8 weight percent tantalum, and about 0.02 to 0.75 weight percent cerium. In addition, these alloys may contain small quantities of aluminum, copper, manganese, silicon, boron, tungsten, molybdenum, iron and zirconium up to a maximum combined total of 1.38 weight percent. Oxygen, nitrogen and low temperature melting point metal elements such as bismuth, arsenic, and lead are held to the lowest concentration levels possible. In an optimum form, an alloy of this invention consists of about 29% chromium, 20% nickel, 6% tantalum, 0.05% carbon, 0.25% cerium, balance cobalt.

As an article of manufacture, the present invention takes various forms. Briefly described, it is a weld wire of the novel alloy of this invention, or it is a composite structure such as a hot stage gas turbine engine component coated with a protective layer of said novel alloy. As another alternative, it is a gas turbine engine nozzle having a crack weld repaired and filled with the said novel alloy.

BRIEF DESCRIPTION OF THE DRAWINGS

In the drawings accompanying and forming a part of this specification.

DETAILED DESCRIPTION OF THE PREFERRED EMBODIMENT

Production of an alloy of this invention may be the choice of the operator but in accordance with my present practice a melt of cobalt, chromium, nickel, tantalum and carbon is prepared under vacuum i.e. by vacuum induction melting. Cerium or misch metal is added near the end of the melt. The ingot is then remelted a second time to promote homogenization and structure refinement for successful primary breakdown. The resulting billets are processed to various wrought shapes; bar and weld wire. Alternatively, the ingot may be converted to powder form.

When these new alloys are applied as overlay coatings to gas turbine shroud blocks and the like, I prefer to use low pressure (i.e. vacuum) plasma spray, electron beam physical vapor deposition (PVD), or argon-shrouded plasma spray. Various suitable alternatives are available as described in the textbook *Vapor Deposition* by Powell et al [(John Wiley & Sons, Inc., pages 242-246 (1966)] and "Low Pressure Plasma Spray Coatings for Hot Corrosion Resistance"—Smith et al [Trans. 9th Int. Spraying Conference, page 334 (1980)].

In using weld wire of this invention in repairing cracks in cast alloy bodies, my preference is to employ gas-tungsten-arc practice, but those skilled in the art will understand that other procedures may be used so long as welds of requisite strength, ductility, and integrity are provided.

Figure 1:
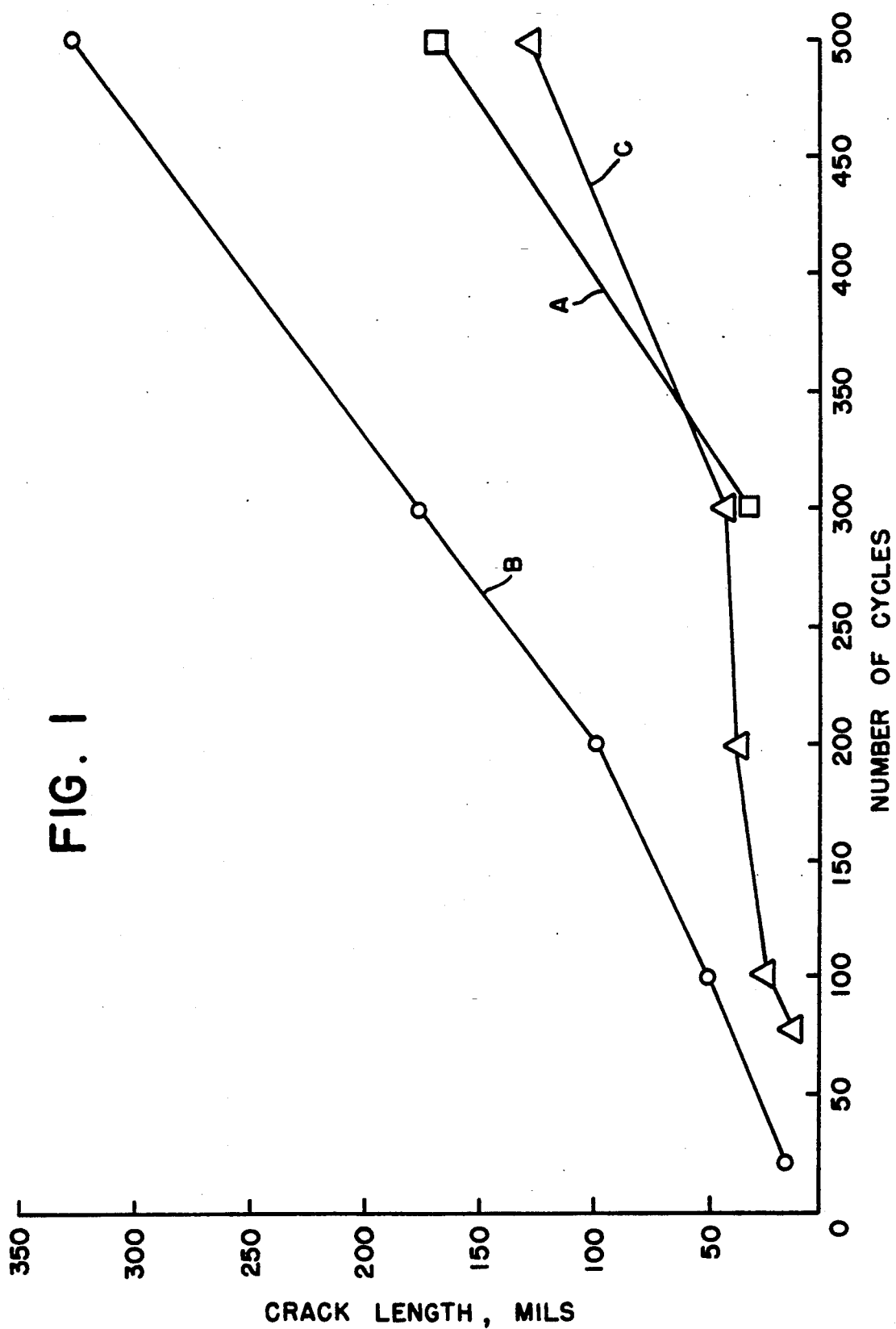
FIG. 1 is a chart on which the time to crack initiation and crack length in mils is plotted against number of cycles, the results of thermal fatigue tests of the specimens embodying this invention and those of two selected prior art filler weld wire alloys being illustrated by the curves joining the respective alloy data points.
Figure 5:
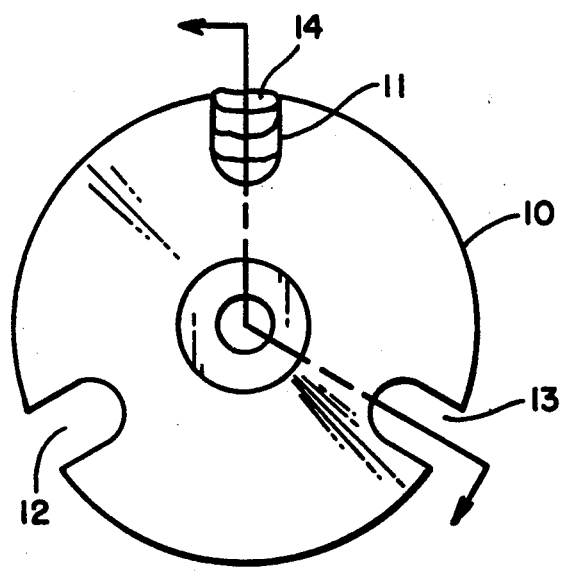
FIG. 5 is a plan view of a thermal fatigue test specimen employed in evaluation of alloys of this invention and those of the prior art as filler weld materials with the results shown on FIG. 1; and, FIG. 6 is a sectional view of the specimen of FIG. 5 taken on line 6—6 thereof.
Figure 6:
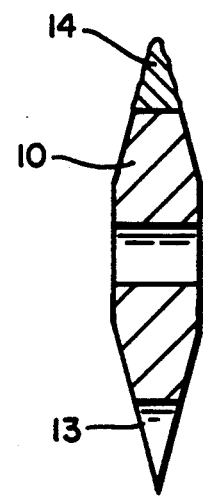

Tests have been conducted with specimens of alloys of the prior art and an alloy of this invention (29% Cr, 20% Ni, 6% Ta, 0.25% Ce, 0.05% C, balance Co). Thus in one test series thermal fatigue behavior of welds was determined through the use of test specimens, as illustrated at 10 in FIG. 5, of a cobalt-base superalloy used in production of gas turbine engine nozzles having notches 11, 12 and 13 which are filled with weld metal, as indicated at 14 in FIG. 6. Crack initiation and growth curves A, B and C in FIG. 1 represent, respectively, the data gathered in these thermal fatigue tests under simulated conditions to which nozzles are typically subjected in normal service operation, specifically fluid bed temperature-time cycles of 1588° F. for four minutes plus 70° F. for four minutes. Testing was interrupted at 20, 40, 60, 80, 100, 150, 200 and 300 cycles for inspection of crack initiation and measurement of crack extension and was terminated after 500 cycles. The data resulting from these tests is indicated by curves A, B and C on the chart of FIG. 1 representing, respectively, this invention alloy, alloy L-605 and alloy FSX-414 LC.

Figure 2:
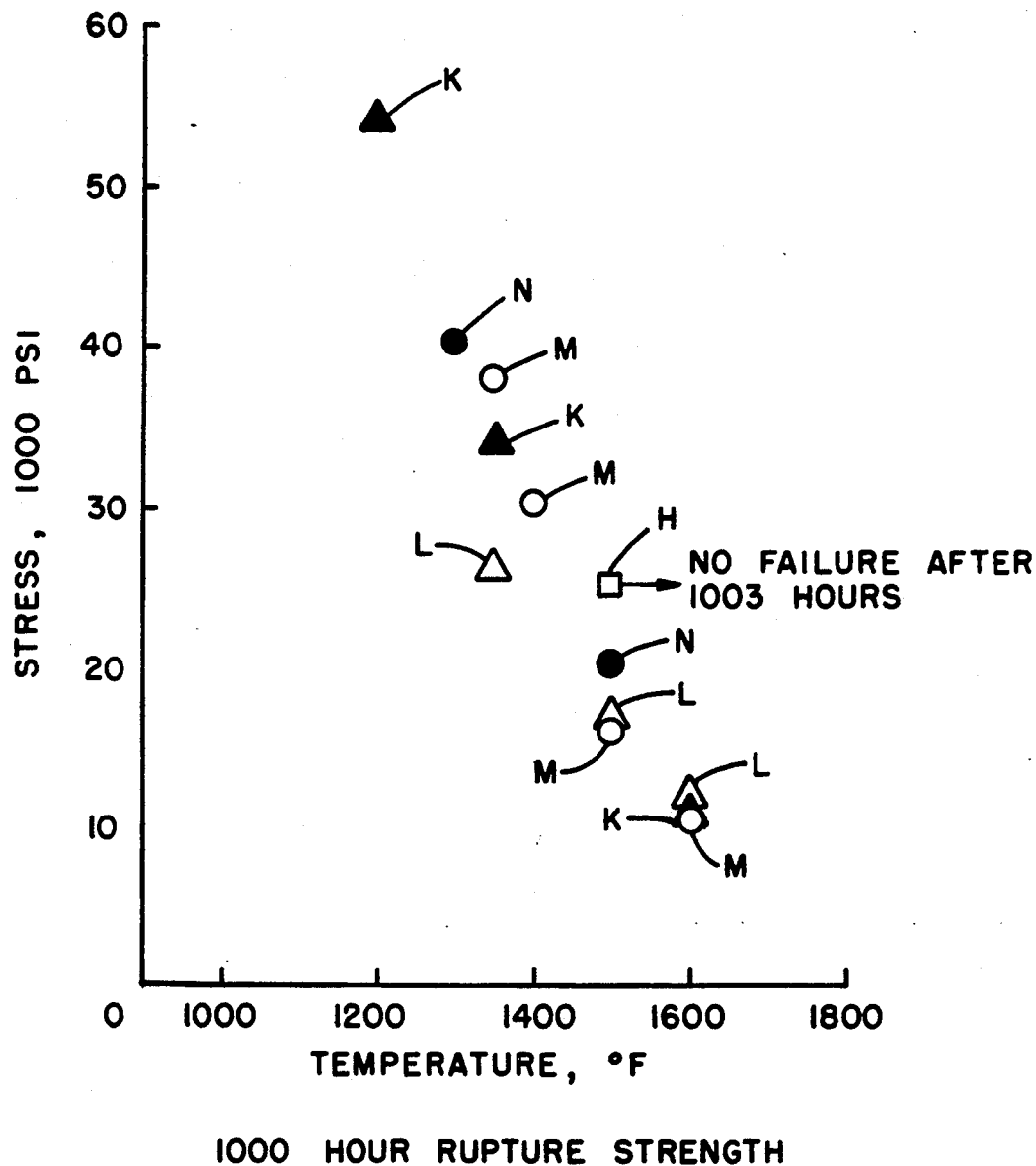
FIG. 2 is a 1000 hour rupture strength chart on which stress is plotted against temperature, the results of rupture strength tests of a specimen embodying this invention and corresponding test data reported in the literature for four prior art alloys being shown as individual data points.

In other test series, rupture strength of the same alloy of this invention as immediately above was measured at 1500° F./25 ksi. The resulting data is indicated at data point H on the chart of FIG. 2, where literature data points for alloys L-605, FSX-414, HS-188 and MM-918 are shown as K, L, M and N, respectively. After 1003 hours, there was no sign of failure in any of the invention alloy specimens and testing was then terminated. On the other hand, the data points representing each of the other alloys indicate failure of a test specimen. The clear superiority of the present invention alloy in respect to rupture strength is apparent.

Data gathered in tensile tests made on specimens of the aforesaid 29% chromium alloy of this invention are set out in Table I below. Comparable data obtained from the literature for the L-605, HS-188 and MM-918 alloys are also stated in Table I.

TABLE I

| ALLOY | TEST TEMP (°F.) | ULTIMATE TENSILE STR. (psi) | 0.2% YIELD STRENGTH (psi) | TENSILE ELONGATION (%) |
|---|---|---|---|---|
| Invention | 1400 | 103,400 | 71,800 | 41.2 |
| L605 | 1400 | 66,000 | 38,000 | 12.0 |
| HS 188 | 1400 | 92,000 | 42,000 | 43.0 |
| MM 918 | 1400 | 81,100 | 26,800 | 52.8 |
| Invention | 1600 | 60,100 | 54,500 | 48.8 |
| L605 | 1600 | 47,000 | 35,000 | 35.0 |
| HS 188 | 1600 | 61,000 | 38,000 | 73.0 |
| MM 918 | 1600 | 64,600 | 23,700 | 65.3 |

The superior yield strength of the aforesaid 29% chromium alloy of this invention in two temperature regimes (1400° F. and 1600° F.) is apparent from the Table I data.

Comparison hot corrosion/oxidation tests were made of the invention alloy and the best current state-of-the-art alloy with the results set out in Table II below using a conventional burner rig with round pin specimens of each alloy being subjected to temperatures of 1350° F., 1600° F. and 1700° F. The fuel used for the 1350° F. and 1600° F. tests was #2 diesel oil doped with tertiary butyl disulfide (to provide 1% sulfur) and with about 500 parts per million synthetic sea salt. Sufficient $SO_2$ was added to the combustion air to approximate levels of sulfur comparable to the prevailing in normal marine and industrial gas turbine operation. The 1700° F. tests were conducted with natural gas fuel under purely oxidizing conditions. At 1350° F., under severe Type II hot corrosion conditions, the invention alloy showed an average penetration of 0.00015 inch compared to 0.0009 inch for alloy MM-918 after 2000 hours.

At 1600° F., also under Type II conditions, average penetration depth of the invention alloy after 2000 hours was 4.7 mils compared to 6.7 mils for alloy MM-918. Thus, again the clear superiority of the invention alloy over alloy MM-918 is apparent.

TABLE II

| ALLOY | TEMP./FUEL | HOURS | AVERAGE PENETRATION, MILS |
|---|---|---|---|
| Invention | 1350 F./DIESEL OIL | 2000 | .15 |
| MM-918 | 1350 F./DIESEL OIL | 2000 | .90 |
| Invention | 1600 F./DIESEL OIL | 2000 | 4.7 |
| MM-918 | 1600 F./DIESEL OIL | 2000 | 6.7 |

Figure 3:
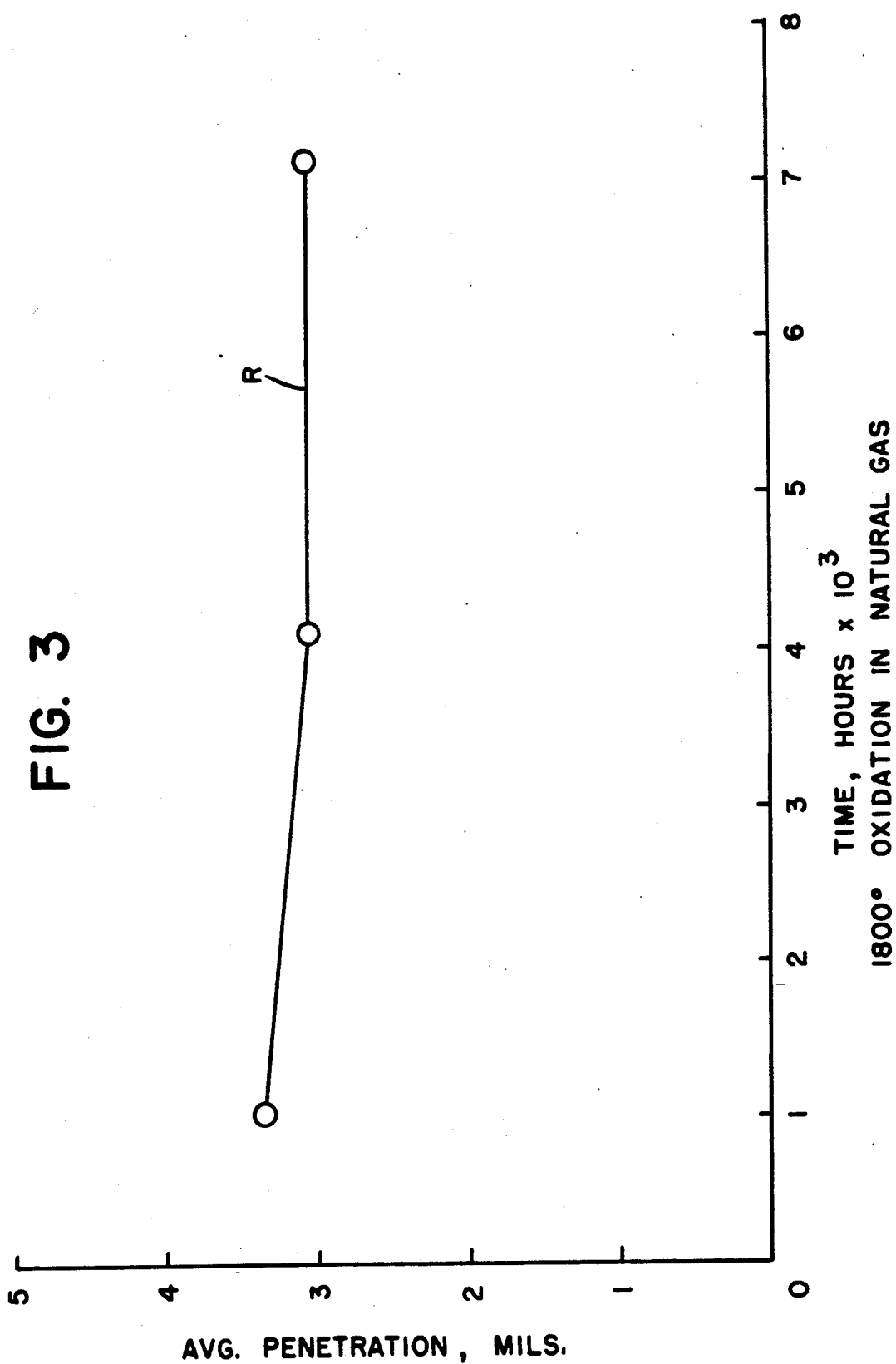
FIG. 3 is another chart on which oxidation resistance in natural gas at 1800° F. is shown as a curve joining test data points, average penetration in mils being plotted against time in thousands of hours.

Finally, a series of high temperature oxidation resistance tests were conducted on the said 29% chromium invention alloy. These tests were made using a burner rig and round pin specimens, as in the hot corrosion/oxidation tests described above. In these tests natural gas was employed. The resulting data is shown as data points joined by curve R on the chart of FIG. 3.

In the foregoing accounts of experimental tests the selected commercial alloys are as follows:

Alloy L-605—one of the earliest Co-base wrought alloys.

Alloy FSX-414 LC—low carbon weld wire version of a GE patented cast Co-base alloy.

Alloy HS-188—Modification of L-605 containing a small quantity of La.

Alloy MM-918—U.S. Pat. No. 3,366,478—Claim 9.

Figure 4:
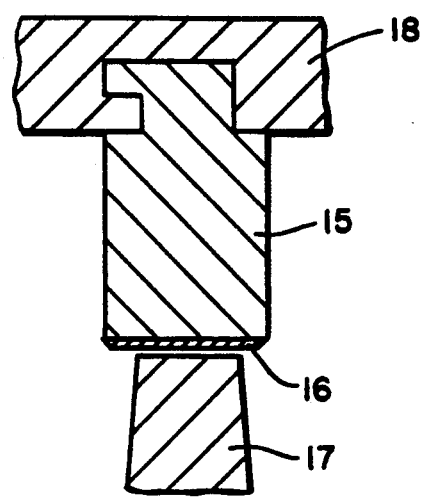
FIG. 4 is a fragmentary, transverse sectional view of a gas turbine engine shell, shroud block and turbine bucket in which the shroud block is coated with an alloy of this invention on the surface portion opposed to the bucket tip.

As shown in FIG. 4, this invention takes the form of a composite body, specifically a gas turbine engine shroud block 15 coated with an alloy of this invention. Thus, the surface portion of block 15 opposed to turbine bucket tip 17 has a coat 16 of this invention alloy. Consequently, block 15 which is secured to the turbine shell 18 is protected against oxidation and corrosion in a critical location by a thermal fatigue, crack resistant coat 16 which is suitably about 8-10 mils thick and is provided by air plasma spray or vacuum plasma spray technique.

In this specification and the appended claims where ratios, proportions or percentages are stated, reference is to the weight basis unless otherwise specified.

The four commercial alloys tested as set out above are of compositions listed below:

|    | L-605 | FSX-414LC | HS-188 | MM-918 |
|----|-------|-----------|--------|--------|
| Cr | 20%   | 29%       | 22%    | 20%    |
| Ni | 10    | 10        | 22     | 20     |
| TA | —     | —         | —      | 7.5    |
| W  | 15    | 7.5       | 14     | —      |
| Mu | 1.50  |           |        |        |
| Si | 0.50  | —         | 0.40   | —      |
| C  | 0.15  | 0.25      | 0.10   | 0.05   |
| La | —     | —         | 0.08   | —      |
| Fe | —     | 1.0       | —      | —      |
| Zr | —     | —         | —      | 0.10   |
| B  | —     | 0.01      | —      | —      |
| Co | Bal   | Bal       | Bal    | Bal    |

I claim:

1. A cobalt-base wrought alloy having an unique combination of elevated high temperature strength, oxidation resistance, hot corrosion resistance, resistance to thermal fatigue and consequent special utility in gas turbine engine environments at 1800° F., consisting essentially of about 29% chromium, about 20% nickel, about 6% tantalum, about 0.25% cerium and about 0.05% carbon, remainder cobalt.

2. As an article of manufacture, a weld wire of cobalt-base wrought alloy consisting essentially of about 29% chromium, about 20% nickel, about 6% tantalum, about 0.25% cerium and about 0.05% carbon, remainder cobalt.

3. A cast cobalt alloy gas turbine engine nozzle having a crack repaired with a cobalt-base wrought alloy weld filler consisting essentially of about 29% chromium, about 20% nickel, about 6% tantalum, about 0.25% cerium and about 0.05% carbon, remainder cobalt.

4. A composite article in the form of a hot stage gas turbine engine component coated locally with a layer of a cobalt-base alloy consisting essentially of about 29% chromium, about 20% nickel, about 6% tantalum, about 0.75% of cerium and about 0.05% carbon, remainder cobalt.

* * * * *